United States Patent
Jones et al.

(10) Patent No.: US 12,388,539 B2
(45) Date of Patent: *Aug. 12, 2025

(54) METHOD AND SYSTEM FOR IMPROVED ACOUSTIC TRANSMISSION OF DATA

(71) Applicant: SONOS EXPERIENCE LIMITED, Hayes (GB)

(72) Inventors: Daniel John Jones, London (GB); James Andrew Nesfield, London (GB)

(73) Assignee: Sonos Experience Limited, Hayes (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,045

(22) Filed: Jan. 5, 2024

(65) Prior Publication Data

US 2024/0333401 A1  Oct. 3, 2024

Related U.S. Application Data

(63) Continuation of application No. 16/956,905, filed as application No. PCT/GB2018/053733 on Dec. 20, 2018, now Pat. No. 11,870,501.

(30) Foreign Application Priority Data

Dec. 20, 2017 (GB) .................... 1721457

(51) Int. Cl.
H04L 27/10    (2006.01)
H04B 11/00    (2006.01)

(52) U.S. Cl.
CPC .................... H04B 11/00 (2013.01)

(58) Field of Classification Search
CPC .............. H04B 11/00; H04L 1/0071
USPC ........ 375/275, 272, 303, 307, 334, 335, 260
See application file for complete search history.

(56) References Cited

U.S. PATENT DOCUMENTS

| | | |
|---|---|---|
| 4,045,616 A | 8/1977 | Sloane |
| 4,048,074 A | 9/1977 | Bruenemann et al. |
| 4,088,030 A | 5/1978 | Iversen et al. |
| 4,101,885 A | 7/1978 | Blum |
| 4,323,881 A | 4/1982 | Mori |
| 4,794,601 A | 12/1988 | Kikuchi |
| 6,133,849 A | 10/2000 | McConnell et al. |
| 6,163,803 A | 12/2000 | Watanabe |

(Continued)

FOREIGN PATENT DOCUMENTS

| | | |
|---|---|---|
| CN | 103259563 A | 8/2013 |
| CN | 105790852 A | 7/2016 |

(Continued)

OTHER PUBLICATIONS

U.S. Appl. No. 62/519,024, filed Jun. 13, 2017.*

(Continued)

*Primary Examiner* — Phuong Phu
(74) *Attorney, Agent, or Firm* — Nixon & Vanderhye, P.C.

(57) ABSTRACT

The present invention relates to a method for communicating data acoustically. The method includes segmenting the data into a sequence of symbols; encoding each symbol of the sequence into a plurality of tones; and acoustically generating the plurality of tones simultaneously for each symbol in sequence. Each of the plurality of tones for each symbol in the sequence may be at a different frequency.

20 Claims, 2 Drawing Sheets

(56) References Cited

U.S. PATENT DOCUMENTS

| | | |
|---|---|---|
| 6,272,535 B1 | 8/2001 | Iwamura |
| 6,532,477 B1 | 3/2003 | Tang et al. |
| 6,711,538 B1 | 3/2004 | Omori et al. |
| 6,766,300 B1 | 7/2004 | Laroche |
| 6,798,889 B1 | 9/2004 | Dicker et al. |
| 6,909,999 B2 | 6/2005 | Thomas et al. |
| 6,996,532 B2 | 2/2006 | Thomas |
| 7,058,726 B1 | 6/2006 | Osaku et al. |
| 7,349,668 B2 | 3/2008 | Ilan et al. |
| 7,379,901 B1 | 5/2008 | Philyaw |
| 7,403,743 B2 | 7/2008 | Welch |
| 7,571,014 B1 | 8/2009 | Lambourne et al. |
| 7,944,847 B2 | 5/2011 | Trine et al. |
| 8,483,853 B1 | 7/2013 | Lambourne |
| 8,494,176 B2 | 7/2013 | Suzuki et al. |
| 8,594,340 B2 | 11/2013 | Takara et al. |
| 8,782,530 B2 | 7/2014 | Beringer et al. |
| 9,118,401 B1 | 8/2015 | Nieto et al. |
| 9,137,243 B2 | 9/2015 | Suzuki et al. |
| 9,237,226 B2 | 1/2016 | Frauenthal et al. |
| 9,270,811 B1 | 2/2016 | Atlas |
| 9,288,597 B2 | 3/2016 | Carlsson et al. |
| 9,344,802 B2 | 5/2016 | Suzuki et al. |
| 10,090,003 B2 | 10/2018 | Wang |
| 10,186,251 B1 | 1/2019 | Mohammadi |
| 10,236,006 B1 | 3/2019 | Gurijala et al. |
| 10,236,031 B1 | 3/2019 | Gurijala |
| 10,498,654 B2 | 12/2019 | Shalev et al. |
| 11,205,437 B1 | 12/2021 | Zhang et al. |
| 11,870,501 B2 * | 1/2024 | Jones ................... H04B 11/00 |
| 2002/0054608 A1 | 5/2002 | Wan et al. |
| 2002/0107596 A1 | 8/2002 | Thomas et al. |
| 2002/0152388 A1 | 10/2002 | Linnartz et al. |
| 2002/0184010 A1 | 12/2002 | Eriksson et al. |
| 2003/0065918 A1 | 4/2003 | Willey |
| 2003/0195745 A1 | 10/2003 | Zinser, Jr. et al. |
| 2003/0212549 A1 | 11/2003 | Steenstra et al. |
| 2004/0002858 A1 | 1/2004 | Attias et al. |
| 2004/0081078 A1 | 4/2004 | McKnight et al. |
| 2004/0133789 A1 | 7/2004 | Gantman et al. |
| 2004/0148166 A1 | 7/2004 | Zheng |
| 2004/0264713 A1 | 12/2004 | Grzesek |
| 2005/0049732 A1 | 3/2005 | Kanevsky et al. |
| 2005/0086602 A1 | 4/2005 | Philyaw et al. |
| 2005/0219068 A1 | 10/2005 | Jones et al. |
| 2006/0167841 A1 | 7/2006 | Allan et al. |
| 2006/0253209 A1 | 11/2006 | Hersbach et al. |
| 2006/0287004 A1 | 12/2006 | Fuqua |
| 2007/0063027 A1 | 3/2007 | Belfer et al. |
| 2007/0121918 A1 | 5/2007 | Tischer |
| 2007/0144235 A1 | 6/2007 | Werner et al. |
| 2007/0174052 A1 | 7/2007 | Manjunath et al. |
| 2007/0192672 A1 | 8/2007 | Bodin et al. |
| 2007/0192675 A1 | 8/2007 | Bodin et al. |
| 2007/0232257 A1 | 10/2007 | Otani et al. |
| 2007/0268162 A1 | 11/2007 | Mss et al. |
| 2008/0002882 A1 | 1/2008 | Voloshynovskyy et al. |
| 2008/0011825 A1 | 1/2008 | Giordano et al. |
| 2008/0027722 A1 | 1/2008 | Haulick et al. |
| 2008/0031315 A1 | 2/2008 | Ramirez et al. |
| 2008/0059157 A1 | 3/2008 | Fukuda et al. |
| 2008/0112885 A1 | 5/2008 | Okunev et al. |
| 2008/0144624 A1 | 6/2008 | Marcondes et al. |
| 2008/0232603 A1 | 9/2008 | Soulodre |
| 2008/0242357 A1 | 10/2008 | White |
| 2008/0262928 A1 | 10/2008 | Michaelis |
| 2009/0034712 A1 | 2/2009 | Grasley et al. |
| 2009/0119110 A1 | 5/2009 | Oh et al. |
| 2009/0123002 A1 | 5/2009 | Karthik et al. |
| 2009/0141890 A1 | 6/2009 | Steenstra et al. |
| 2009/0175257 A1 | 7/2009 | Belmonte et al. |
| 2009/0254485 A1 | 10/2009 | Baentsch et al. |
| 2010/0030838 A1 | 2/2010 | Atsmon et al. |
| 2010/0054275 A1 | 3/2010 | Noonan et al. |
| 2010/0064132 A1 | 3/2010 | Ravikiran Sureshbabu |
| 2010/0088390 A1 | 4/2010 | Bai et al. |
| 2010/0134278 A1 | 6/2010 | Srinivasan et al. |
| 2010/0146115 A1 | 6/2010 | Bezos |
| 2010/0223138 A1 | 9/2010 | Dragt |
| 2010/0260348 A1 | 10/2010 | Bhow et al. |
| 2010/0267340 A1 | 10/2010 | Lee |
| 2010/0290504 A1 | 11/2010 | Torimoto et al. |
| 2010/0290641 A1 | 11/2010 | Steele |
| 2011/0173208 A1 | 7/2011 | Vogel |
| 2011/0216783 A1 | 9/2011 | Takeuchi et al. |
| 2011/0276333 A1 | 11/2011 | Wang et al. |
| 2011/0277023 A1 | 11/2011 | Meylemans et al. |
| 2011/0307787 A1 | 12/2011 | Smith |
| 2012/0045994 A1 | 2/2012 | Koh et al. |
| 2012/0075083 A1 | 3/2012 | Isaacs |
| 2012/0084131 A1 | 4/2012 | Bergel et al. |
| 2012/0214416 A1 | 8/2012 | Kent et al. |
| 2012/0214544 A1 | 8/2012 | Shivappa et al. |
| 2013/0010979 A1 | 1/2013 | Takara et al. |
| 2013/0030800 A1 | 1/2013 | Tracey et al. |
| 2013/0034243 A1 | 2/2013 | Yermeche et al. |
| 2013/0077798 A1 | 3/2013 | Otani et al. |
| 2013/0113558 A1 | 5/2013 | Pfaffinger et al. |
| 2013/0170647 A1 | 7/2013 | Reilly et al. |
| 2013/0216058 A1 | 8/2013 | Furuta et al. |
| 2013/0216071 A1 | 8/2013 | Maher et al. |
| 2013/0223279 A1 | 8/2013 | Tinnakornsrisuphap et al. |
| 2013/0275126 A1 | 10/2013 | Lee |
| 2013/0331970 A1 | 12/2013 | Beckhardt et al. |
| 2014/0003625 A1 | 1/2014 | Sheen et al. |
| 2014/0028818 A1 | 1/2014 | Brockway, III et al. |
| 2014/0037107 A1 | 2/2014 | Marino, Jr. et al. |
| 2014/0046464 A1 | 2/2014 | Reimann |
| 2014/0053281 A1 | 2/2014 | Benoit et al. |
| 2014/0074469 A1 | 3/2014 | Zhidkov |
| 2014/0108020 A1 | 4/2014 | Sharma et al. |
| 2014/0142958 A1 | 5/2014 | Sharma et al. |
| 2014/0164629 A1 | 6/2014 | Barth et al. |
| 2014/0172141 A1 | 6/2014 | Mangold |
| 2014/0172429 A1 | 6/2014 | Butcher et al. |
| 2014/0201635 A1 | 7/2014 | Kumar et al. |
| 2014/0258110 A1 | 9/2014 | Davis et al. |
| 2015/0004935 A1 | 1/2015 | Fu |
| 2015/0088495 A1 | 3/2015 | Jeong et al. |
| 2015/0141005 A1 | 5/2015 | Suryavanshi et al. |
| 2015/0215299 A1 | 7/2015 | Burch et al. |
| 2015/0248879 A1 | 9/2015 | Miskimen et al. |
| 2015/0271676 A1 | 9/2015 | Shin et al. |
| 2015/0349841 A1 | 12/2015 | Mani et al. |
| 2015/0371529 A1 | 12/2015 | Dolecki |
| 2015/0382198 A1 | 12/2015 | Kashef et al. |
| 2016/0007116 A1 | 1/2016 | Holman |
| 2016/0021473 A1 | 1/2016 | Riggi et al. |
| 2016/0098989 A1 | 4/2016 | Layton et al. |
| 2016/0291141 A1 | 10/2016 | Han et al. |
| 2016/0309276 A1 | 10/2016 | Ridihalgh et al. |
| 2017/0208170 A1 | 7/2017 | Mani et al. |
| 2017/0279542 A1 | 9/2017 | Knauer et al. |
| 2018/0106897 A1 | 4/2018 | Shouldice et al. |
| 2018/0115844 A1 | 4/2018 | Lu et al. |
| 2018/0167147 A1 | 6/2018 | Almada et al. |
| 2018/0213322 A1 | 7/2018 | Napoli et al. |
| 2018/0359560 A1 | 12/2018 | Defraene et al. |
| 2019/0035719 A1 | 1/2019 | Daitoku et al. |
| 2019/0045301 A1 | 2/2019 | Family et al. |
| 2019/0096398 A1 | 3/2019 | Sereshki |
| 2019/0348041 A1 | 11/2019 | Cella et al. |
| 2020/0029167 A1 | 1/2020 | Bostick et al. |
| 2020/0091963 A1 | 3/2020 | Christoph et al. |
| 2020/0105128 A1 | 4/2020 | Frank |
| 2020/0169327 A1 * | 5/2020 | Lin ................... H04L 1/0071 |
| 2020/0301651 A1 | 9/2020 | Georganti |
| 2021/0029452 A1 | 1/2021 | Tsoi et al. |
| 2021/0098008 A1 | 4/2021 | Nesfield et al. |

(56) References Cited

U.S. PATENT DOCUMENTS

2022/0059123 A1 2/2022 Sheaffer et al.
2022/0322010 A1 10/2022 Seefedlt et al.

FOREIGN PATENT DOCUMENTS

| CN | 106921650 A | 7/2017 |
| --- | --- | --- |
| EP | 1612999 A1 | 1/2006 |
| EP | 1760693 A1 | 3/2007 |
| EP | 2334111 A1 | 6/2011 |
| EP | 2916554 A1 | 9/2015 |
| EP | 3275117 A1 | 1/2018 |
| EP | 3408936 A2 | 12/2018 |
| EP | 3526912 A1 | 8/2019 |
| GB | 2369995 A | 6/2002 |
| GB | 2484140 A | 4/2012 |
| JP | H1078928 A | 3/1998 |
| JP | 2001320337 A | 11/2001 |
| JP | 2004512765 A | 4/2004 |
| JP | 2004139525 A | 5/2004 |
| JP | 2007121626 A | 5/2007 |
| JP | 2007195105 A | 8/2007 |
| JP | 2008219909 A | 9/2008 |
| WO | 0016497 A1 | 3/2000 |
| WO | 0115021 A2 | 3/2001 |
| WO | 0150665 A1 | 7/2001 |
| WO | 0161987 A2 | 8/2001 |
| WO | 0163397 A1 | 8/2001 |
| WO | 0211123 A2 | 2/2002 |
| WO | 0235747 A2 | 5/2002 |
| WO | 2004002103 A1 | 12/2003 |
| WO | 2005006566 A2 | 1/2005 |
| WO | 2005013047 A2 | 2/2005 |
| WO | 2008131181 A2 | 10/2008 |
| WO | 2016094687 A1 | 6/2016 |

OTHER PUBLICATIONS

Madhavapeddy et al., Context-Aware Computing with Sound, University of Cambridge 2003, pp. 315-332.
Monaghan et al. "A method to enhance the use of interaural time differences for cochlear implants in reverberant environments.", published Aug. 17, 2016, Journal of the Acoustical Society of America, 140, pp. 1116-1129. Retrieved from the Internet URL: https://asa.scitation.org/doi/10.1121/1.4960572 Year: 2016, 15 pages.
Non-Final Office Action mailed Mar. 25, 2015, issued in connection with U.S. Appl. No. 12/926,470, filed Nov. 19, 2010, 24 pages.
Non-Final Office Action mailed Mar. 28, 2016, issued in connection with U.S. Appl. No. 12/926,470, filed Nov. 19, 2010, 26 pages.
Non-Final Office Action mailed Jan. 6, 2017, issued in connection with U.S. Appl. No. 12/926,470, filed Nov. 19, 2010, 22 pages.
Non-Final Office Action mailed Aug. 9, 2019, issued in connection with U.S. Appl. No. 16/012,167, filed Jun. 19, 2018, 15 pages.
Non-Final Office Action mailed on Oct. 4, 2022, issued in connection with U.S. Appl. No. 16/496,685, filed Sep. 23, 2019, 15 pages.
Non-Final Office Action mailed on Feb. 5, 2014, issued in connection with U.S. Appl. No. 12/926,470, filed Nov. 19, 2010, 22 pages.
Non-Final Office Action mailed on Jul. 1, 2022, issued in connection with U.S. Appl. No. 16/623,160, filed Dec. 16, 2019, 10 pages.
Non-Final Office Action mailed on Jul. 11, 2022, issued in connection with U.S. Appl. No. 17/660,185, filed Apr. 21, 2022, 20 pages.
Non-Final Office Action mailed on Aug. 12, 2021, issued in connection with U.S. Appl. No. 16/342,060, filed Apr. 15, 2019, 88 pages.
Non-Final Office Action mailed on Oct. 15, 2021, issued in connection with U.S. Appl. No. 16/496,685, filed Sep. 23, 2019, 12 pages.
Non-Final Office Action mailed on May 19, 2023, issued in connection with U.S. Appl. No. 16/956,905, filed Jun. 22, 2020, 20 pages.
Non-Final Office Action mailed on Jul. 21, 2022, issued in connection with U.S. Appl. No. 16/956,905, filed Jun. 22, 2020, 15 pages.
Non-Final Office Action mailed on Sep. 24, 2020, issued in connection with U.S. Appl. No. 16/012,167, filed Jun. 19, 2018, 20 pages.
Non-Final Office Action mailed on Dec. 27, 2021, issued in connection with U.S. Appl. No. 16/956,905, filed Jun. 22, 2020, 12 pages.
Non-Final Office Action mailed on Jan. 29, 2021, issued in connection with U.S. Appl. No. 16/342,060, filed Apr. 15, 2019, 59 pages.
Non-Final Office Action mailed on Feb. 5, 2021, issued in connection with U.S. Appl. No. 16/342,078, filed Apr. 15, 2019, 13 pages.
Non-Final Office Action mailed on Dec. 6, 2023, issued in connection with U.S. Appl. No. 18/140,393, filed Apr. 27, 2023, 15 pages.
Non-Final Office Action mailed on Sep. 7, 2021, issued in connection with U.S. Appl. No. 16/623,160, filed Dec. 16, 2019, 11 pages.
Notice of Allowance mailed Mar. 15, 2018, issued in connection with U.S. Appl. No. 12/926,470, filed Nov. 19, 2010, 10 pages.
Notice of Allowance mailed Mar. 19, 2021, issued in connection with U.S. Appl. No. 16/012,167, filed Jun. 19, 2018, 9 pages.
Notice of Allowance mailed on Feb. 8, 2023, issued in connection with U.S. Appl. No. 16/623,160, filed Dec. 16, 2019, 10 pages.
Notice of Allowance mailed on Sep. 1, 2023, issued in connection with U.S. Appl. No. 16/956,905, filed Jun. 22, 2020, 8 pages.
Notice of Allowance mailed on Aug. 11, 2022, issued in connection with U.S. Appl. No. 16/342,078, filed Apr. 15, 2019, 15 pages.
Notice of Allowance mailed on Aug. 11, 2023, issued in connection with U.S. Appl. No. 17/883,020, filed Aug. 8, 2022, 21 pages.
Notice of Allowance mailed on Feb. 18, 2022, issued in connection with U.S. Appl. No. 16/564,766, filed Sep. 9, 2019, 8 pages.
Notice of Allowance mailed on Sep. 19, 2023, issued in connection with U.S. Appl. No. 17/460,708, filed Aug. 30, 2021, 10 pages.
Notice of Allowance mailed on Jan. 23, 2024, issued in connection with U.S. Appl. No. 17/460,708, filed Aug. 30, 2021, 9 pages.
Notice of Allowance mailed on Jan. 27, 2023, issued in connection with U.S. Appl. No. 16/496,685, filed Sep. 23, 2019, 7 pages.
Notice of Allowance mailed on Mar. 29, 2022, issued in connection with U.S. Appl. No. 16/342,060, filed Apr. 15, 2019, 24 pages.
Notice of Allowance mailed on Apr. 5, 2022, issued in connection with U.S. Appl. No. 16/956,905, filed Jun. 22, 2020, 9 pages.
Notice of Allowance mailed on Feb. 7, 2023, issued in connection with U.S. Appl. No. 16/342,078, filed Apr. 15, 2019, 12 pages.
Soriente et al., "HAPADEP: Human-Assisted Pure Audio Device Pairing" Computer Science Department, University of California Irvine, 12 pages. [Retrieved Online] URLhttps://www.researchgate.net/publication/220905534_HAPADEP_Human-assisted_pure_audio_device_pairing.
Tarr, E.W. "Processing perceptually important temporal and spectral characteristics of speech", 2013, Available from ProQuest Dissertations and Theses Professional. Retrieved from https://dialog.proquest.com/professional/docview/1647737151?accountid=131444, 200 pages.
United Kingdom Patent Office, United Kingdom Examination Report mailed on Oct. 8, 2021, issued in connection with United Kingdom Application No. GB2113511.6, 7 pages.
United Kingdom Patent Office, United Kingdom Examination Report mailed on Jun. 11, 2021, issued in connection with United Kingdom Application No. GB1716909.5, 5 pages.
United Kingdom Patent Office, United Kingdom Examination Report mailed on Feb. 2, 2021, issued in connection with United Kingdom Application No. GB1715134.1, 5 pages.
United Kingdom Patent Office, United Kingdom Examination Report mailed on Oct. 29, 2021, issued in connection with United Kingdom Application No. GB1709583.7, 3 pages.
United Kingdom Patent Office, United Kingdom Office Action mailed on May 10, 2022, issued in connection with United Kingdom Application No. GB2202914.4, 5 pages.
United Kingdom Patent Office, United Kingdom Office Action mailed on Jan. 22, 2021, issued in connection with United Kingdom Application No. GB1906696.8, 2 pages.
United Kingdom Patent Office, United Kingdom Office Action mailed on Mar. 24, 2022, issued in connection with United Kingdom Application No. GB2202914.4, 3 pages.

(56) References Cited

OTHER PUBLICATIONS

United Kingdom Patent Office, United Kingdom Office Action mailed on Jan. 28, 2022, issued in connection with United Kingdom Application No. GB2113511.6, 3 pages.
United Kingdom Patent Office, United Kingdom Office Action mailed on Feb. 9, 2022, issued in connection with United Kingdom Application No. GB2117607.8, 3 pages.
United Kingdom Patent Office, United Kingdom Search Report mailed on Sep. 22, 2021, issued in connection with United Kingdom Application No. GB2109212.7, 5 pages.
Wang, Avery Li-Chun. An Industrial-Strength Audio Search Algorithm. Oct. 27, 2003, 7 pages. [online]. [retrieved on May 12, 2020] Retrieved from the Internet URL: https://www.researchgate.net/publication/220723446_An_Industrial_Strength_Audio_Search_Algorithm.
Advisory Action mailed on Mar. 1, 2022, issued in connection with U.S. Appl. No. 16/342,078, filed Apr. 15, 2019, 3 pages.
Advisory Action mailed on Aug. 19, 2022, issued in connection with U.S. Appl. No. 16/496,685, filed Sep. 23, 2019, 3 pages.
Bourguet et al. "A Robust Audio Feature Extraction Algorithm for Music Identification," AES Convention 129; Nov. 4, 2010, 7 pages.
C. Beaugeant and H. Taddei, "Quality and computation load reduction achieved by applying smart transcoding between CELP speech codecs," 2007, 2007 15th European Signal Processing Conference, pp. 1372-1376.
European Patent Office, Decision to Refuse mailed on Nov. 13, 2019, issued in connection with European Patent Application No. 11773522.5, 52 pages.
European Patent Office, European EPC Article 94.3 mailed on Oct. 8, 2021, issued in connection with European Application No. 17790809.2, 9 pages.
European Patent Office, European EPC Article 94.3 mailed on Dec. 10, 2021, issued in connection with European Application No. 18845403.7, 41 pages.
European Patent Office, European EPC Article 94.3 mailed on Oct. 12, 2021, issued in connection with European Application No. 17795004.5, 8 pages.
European Patent Office, European EPC Article 94.3 mailed on Oct. 25, 2022, issued in connection with European Application No. 20153173.8, 5 pages.
European Patent Office, European EPC Article 94.3 mailed on Oct. 28, 2021, issued in connection with European Application No. 18752180.2, 7 pages.
European Patent Office, European EPC Article 94.3 mailed on Jul. 6, 2022, issued in connection with European Application No. 20153173.8, 4 pages.
European Patent Office, European Extended Search Report mailed on May 27, 2024, issued in connection with European Application No. 24155085.4, 9 pages.
European Patent Office, European Extended Search Report mailed on Aug. 31, 2020, issued in connection with European Application No. 20153173.8, 8 pages.
European Patent Office, Summons to Attend Oral Proceedings mailed on Jul. 13, 2023, issued in connection with European Application No. 18752180.2, 6 pages.
European Patent Office, Summons to Attend Oral Proceedings mailed on Mar. 15, 2019, issued in connection with European Application No. 11773522.5-1217, 10 pages.
European Patent Office, Summons to Attend Oral Proceedings mailed on Mar. 19, 2024, issued in connection with European Application No. 20153173.8, 9 pages.
Final Office Action mailed Oct. 16, 2014, issued in connection with U.S. Appl. No. 12/926,470, filed Nov. 19, 2010, 22 pages.
Final Office Action mailed Aug. 17, 2017, issued in connection with U.S. Appl. No. 12/926,470, filed Nov. 19, 2010, 22 pages.
Final Office Action mailed Nov. 30, 2015, issued in connection with U.S. Appl. No. 12/926,470, filed Nov. 19, 2010, 25 pages.
Final Office Action mailed on Nov. 1, 2022, issued in connection with U.S. Appl. No. 16/623,160, filed Dec. 16, 2019, 10 pages.
Final Office Action mailed on May 10, 2022, issued in connection with U.S. Appl. No. 16/496,685, filed Sep. 23, 2019, 15 pages.
Final Office Action mailed on Nov. 15, 2022, issued in connection with U.S. Appl. No. 16/956,905, filed Jun. 22, 2020, 16 pages.
Final Office Action mailed on Mar. 18, 2022, issued in connection with U.S. Appl. No. 16/623,160, filed Dec. 16, 2019, 14 pages.
Final Office Action mailed on Apr. 20, 2020, issued in connection with U.S. Appl. No. 16/012,167, filed Jun. 19, 2018, 21 pages.
Gerasimov et al. "Things That Talk: Using sound for device-to-device and device-to-human communication", Feb. 2000 IBM Systems Journal 39(3.4): 530-546, 18 pages. [Retrieved Online] URLhttps://www.researchgate.net/publication/224101904_Things_that_talk_Using_sound_for_device-to-device_and_device-to-human_communication.
Glover et al. "Real-time detection of musical onsets with linear prediction and sinusoidal modeling.", 2011 EURASIP Journal on Advances in Signal Processing 2011, 68, Retrieved from the Internet URL: https://doi.org/10.1186/1687-6180-2011-68, Sep. 20, 2011, 13 pages.
Gomez et al: "Distant talking robust speech recognition using late reflection components of room impulse response", Acoustics, Speech and Signal Processing, 2008. ICASSP 2008. IEEE International Conference on, IEEE, Piscataway, NJ, USA, Mar. 31, 2008, XP031251618, ISBN: 978-1-4244-1483-3, pp. 4581-4584.
Gomez et al., "Robust Speech Recognition in Reverberant Environment by Optimizing Multi-band Spectral Subtraction", 2013 IEEE International Conference on Acoustics, Speech and Signal Processing ICASSP, Jan. 1, 2008, 6 pages.
Goodrich et al., Using Audio inn Secure Device Pairing, International Journal of Security and Networks, vol. 4, No. 1.2, Jan. 1, 2009, p. 57, Inderscience Enterprises Ltd., 12 pages.
International Bureau, International Preliminary Report on Patentability and Written Opinion, mailed on Apr. 16, 2019, issued in connection with International Application No. PCT/GB2017/053112, filed on Oct. 13, 2017, 12 pages.
International Bureau, International Preliminary Report on Patentability and Written Opinion, mailed on Apr. 16, 2019, issued in connection with International Application No. PCT/GB2017/053113, filed on Oct. 13, 2017, 8 pages.
International Bureau, International Preliminary Report on Patentability and Written Opinion, mailed on Dec. 17, 2019, issued in connection with International Application No. PCT/GB2018/051645, filed on Jun. 14, 2018, 7 pages.
International Bureau, International Preliminary Report on Patentability and Written Opinion, mailed on Mar. 19, 2019, issued in connection with International Application No. PCT/GB2017/052787, filed on Sep. 19, 2017, 7 pages.
International Bureau, International Preliminary Report on Patentability and Written Opinion, mailed on Jun. 23, 2020, issued in connection with International Application No. PCT/GB2018/053733, filed on Dec. 20, 2018, 7 pages.
International Bureau, International Preliminary Report on Patentability and Written Opinion, mailed on Sep. 24, 2019, issued in connection with International Application No. PCT/GB2018/050779, filed on Mar. 23, 2018, 6 pages.
International Bureau, International Search Report and Written Opinion mailed on Apr. 11, 2019, issued in connection with International Application No. PCT/GB2018/053733, filed on Dec. 20, 2018, 10 pages.
International Bureau, International Search Report and Written Opinion mailed on Sep. 21, 2022, issued in connection with International Application No. PCT/US2022/072465, filed on May 20, 2022, 32 pages.
International Bureau, International Search Report and Written Opinion mailed on Oct. 4, 2018, issued in connection with International Application No. PCT/GB2018/051645, filed on Jun. 14, 2018, 14 pages.
International Searching Authority, International Search Report and Written Opinion mailed on Jan. 5, 2022, issued in connection with International Application No. PCT/US2021/048380, filed on Aug. 31, 2021, 15 pages.

(56) References Cited

OTHER PUBLICATIONS

International Searching Authority, International Search Report and Written Opinion mailed on Mar. 13, 2018, issued in connection with International Application No. PCT/GB2017/053112, filed on Oct. 13, 2017, 18 pages.

International Searching Authority, International Search Report and Written Opinion mailed on Nov. 29, 2017, in connection with International Application No. PCT/GB2017/052787, 10 pages.

International Searching Authority, International Search Report and Written Opinion mailed on Nov. 30, 2011, in connection with International Application No. PCT/GB2011/051862, 6 pages.

International Searching Authority, International Search Report mailed on Jan. 18, 2018, issued in connection with International Application No. PCT/GB2017/053113, filed on Oct. 17, 2017, 11 pages.

International Searching Authority, International Search Report mailed on Jun. 19, 2018, issued in connection with International Application No. PCT/GB2018/050779, filed on Mar. 23, 2018, 8 pages.

Japanese Patent Office, Office Action dated Jun. 23, 2015, issued in connection with JP Application No. 2013-530801, 8 pages.

Japanese Patent Office, Office Action dated Apr. 4, 2017, issued in connection with JP Application No. 2013-530801, 8 pages.

Japanese Patent Office, Office Action dated Jul. 5, 2016, issued in connection with JP Application No. 2013-530801, 8 pages.

Lopes et al. "Acoustic Modems for Ubiquitous Computing", IEEE Pervasive Computing, Mobile and Ubiquitous Systems. vol. 2, No. 3 Jul.-Sep. 2003, pp. 62-71. [Retrieved Online] URL https://www.researchgate.net/publication/3436996_Acoustic_modems_for_ubiquitous_computing.

Madhavapeddy, Anil. Audio Networking for Ubiquitous Computing, Oct. 24, 2003, 11 pages.

Madhavapeddy et al., Audio Networking: The Forgotten Wireless Technology, IEEE CS and IEEE ComSoc, Pervasive Computing, Jul.-Sep. 2005, pp. 55-60.

* cited by examiner

METHOD AND SYSTEM FOR IMPROVED
ACOUSTIC TRANSMISSION OF DATA

This application is a continuation of U.S. application Ser. No. 16/956,905, filed Jun. 22, 2020, which is the U.S. national phase of International Application No. PCT/GB2018/053733 filed 20 Dec. 2018, which designated the U.S. and claims priority to GB Patent Application No. 1721457.8 filed 20 Dec. 2017, the entire contents of each of which are hereby incorporated by reference.

FIELD OF INVENTION

The present invention is in the field of data communication. More particularly, but not exclusively, the present invention relates to a method and system for acoustic transmission of data.

BACKGROUND

There are a number of solutions to communicating data wirelessly over a short range to and from devices using radio frequencies. The most typical of these is WiFi. Other examples include Bluetooth and Zigbee.

An alternative solution for a short range data communication uses a "transmitting" speaker and "receiving" microphone to send encoded data acoustically over-the-air.

Such an alternative may provide various advantages over radio frequency-based systems. For example, speakers and microphones are cheaper and more prevalent within consumer electronic devices, and acoustic transmission is limited to "hearing" distance.

There exist several over-the-air acoustic communications systems. A popular scheme amongst over-the-air acoustic communications systems is to use Frequency Shift Keying as the modulation scheme, in which digital information is transmitted by modulating the frequency of a carrier signal to convey 2 or more integer levels (M-ary fixed keying, where M is the distinct number of levels).

One such acoustic communication system is described in US Patent Publication No. US2012/084131A1, DATA COMMUNICATION SYSTEM. This system, invented by Patrick Bergel and Anthony Steed, involves the transmission of data using an audio signal transmitted from a speaker and received by a microphone where the data, such as a shortcode, is encoded into a sequence of tones within the audio signal.

Acoustic communication systems using Frequency Shift Keying such as the above system can have a good level of robustness but are limited in terms of their throughput. The data rate is linearly proportional to the number of tones available (the alphabet size), divided by the duration of each tone. This is robust and simple in complexity, but is spectrally inefficient.

Radio frequency data communication systems may use phase- and amplitude-shift keying to ensure high throughput. However, both these systems are not viable for over-the-air data transmission in most situations, as reflections and amplitude changes in real-world acoustic environments renders them extremely susceptible to noise.

There is a desire for a system which provides improved throughput in acoustic data communication systems.

It is an object of the present invention to provide a method and system for improved acoustic data transmission which overcomes the disadvantages of the prior art, or at least provides a useful alternative.

SUMMARY OF INVENTION

According to a first aspect of the invention there is provided a method for communicating data acoustically, including:
a) Segmenting the data into a sequence of symbols;
b) Encoding each symbol of the sequence into a plurality of tones; and
c) Acoustically generating the plurality of tones simultaneously for each symbol in sequence;
wherein each of the plurality of tones for each symbol in the sequence are at a different frequency.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides an improved method and system for acoustically communicating data.

The inventors have discovered that throughput can be increased significantly in a tone-based acoustic communication system by segmenting the data into symbols and transmitting K tones simultaneously for each symbol where the tones are selected from an alphabet of size M. In this way, a single note comprising multiple tones can encode symbols of size $\log_2$ (M choose K) bits compared to a single tone note which encodes a symbol into only $\log_2$ (M) bits. The inventors have discovered that this method of increasing data density is significantly less susceptible to noise in typical acoustic environments compared to PSK and ASK at a given number of bits per symbol.

Figure 1:
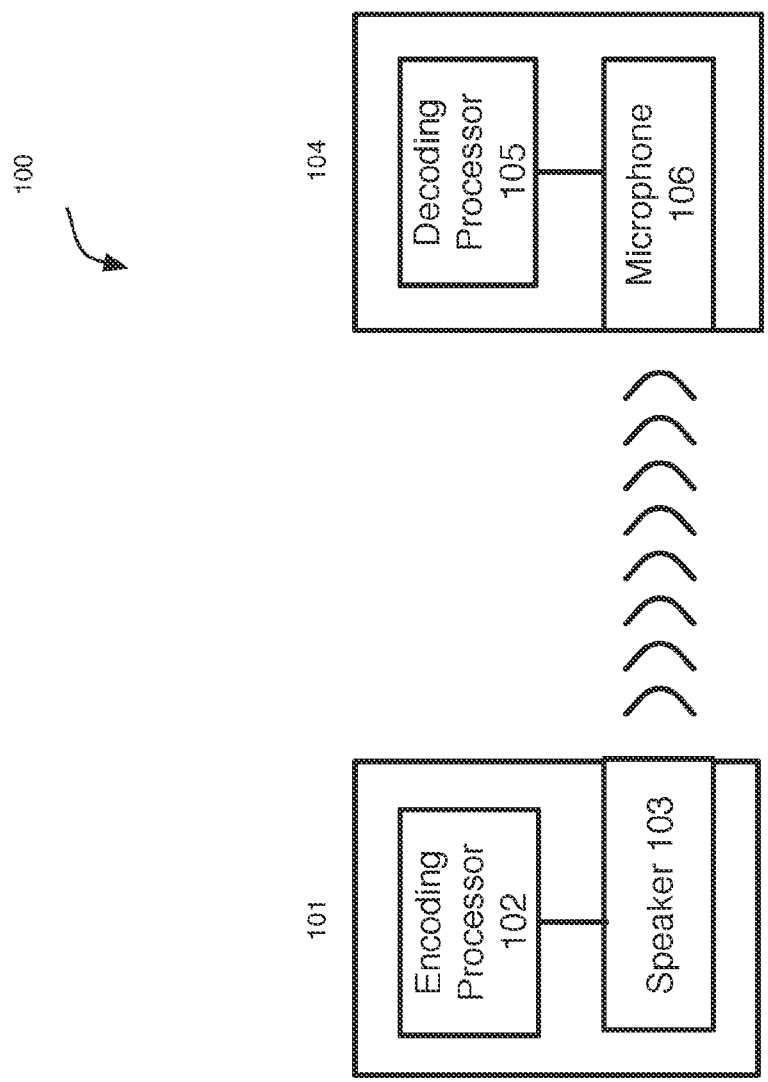
FIG. 1: shows block diagram illustrating a data communication system in accordance with an embodiment of the invention.

In FIG. 1, an acoustic data communication system 100 in accordance with an embodiment of the invention is shown.

The system 100 may include a transmitting apparatus 101 comprising an encoding processor 102 and a speaker 103.

The encoding processor 102 may be configured for segmenting data into a sequence of symbols and for encoding each symbol of the sequence into a plurality of tones. Each symbol may be encoded such that each of the plurality of tones are different. Each symbol may be encoded into K tones. The data may be segmented into symbols corresponding to B bits of the data. B may be log 2 (M choose K) where M is the size of the alphabet for the tones. The alphabet of tones may be spread evenly over a frequency spectrum or may be spread in ways to improve transmission.

The processor 102 and/or speaker 103 may be configured for acoustically transmitting the plurality of tones simultaneously for each symbol in sequence. For example, the processor 102 may be configured for summing the plurality of tones into a single note or chord for generation at the speaker 103. Alternatively, the speaker 103 may include a plurality of cones and each cone may generate a tone.

The system 100 may include a receiving apparatus 104 comprising a decoding processor 105 and a microphone 106.

The microphone 106 may be configured for receiving an audio signal which originates at the speaker 103.

The decoding processor 105 may be configured for decoding the audio signal into a sequence of notes (or chords), for identifying a plurality of tones within each note, for decoding the plurality of tones for each note into a symbol to form a sequence of symbols, and for reconstituting data from the sequence of symbols.

It will also be appreciated by those skilled in the art that the above embodiments of the invention may be deployed on different apparatuses and in differing architectures. For example, the encoding processor 102 and speaker 103 may exist within different devices and the audio signal to be generated may be transmitted from the encoding processor 102 (e.g. the processor 102 may be located at a server) to the speaker 103 (e.g. via a network, or via a broadcast system) for acoustic generation (for example, the speaker 103 may be within a television or other audio or audio/visual device). Furthermore, the microphone 106 and decoding processor 105 may exist within different devices. For example, the microphone 106 may transmit the audio signal, or a representation thereof, to a decoding processor 105 in the cloud.

The functionality of the apparatuses 101 and 104 and/or processors 102 and 105 may be implemented, at least in part, by computer software stored on an intangible computer-readable medium.

Figure 2:
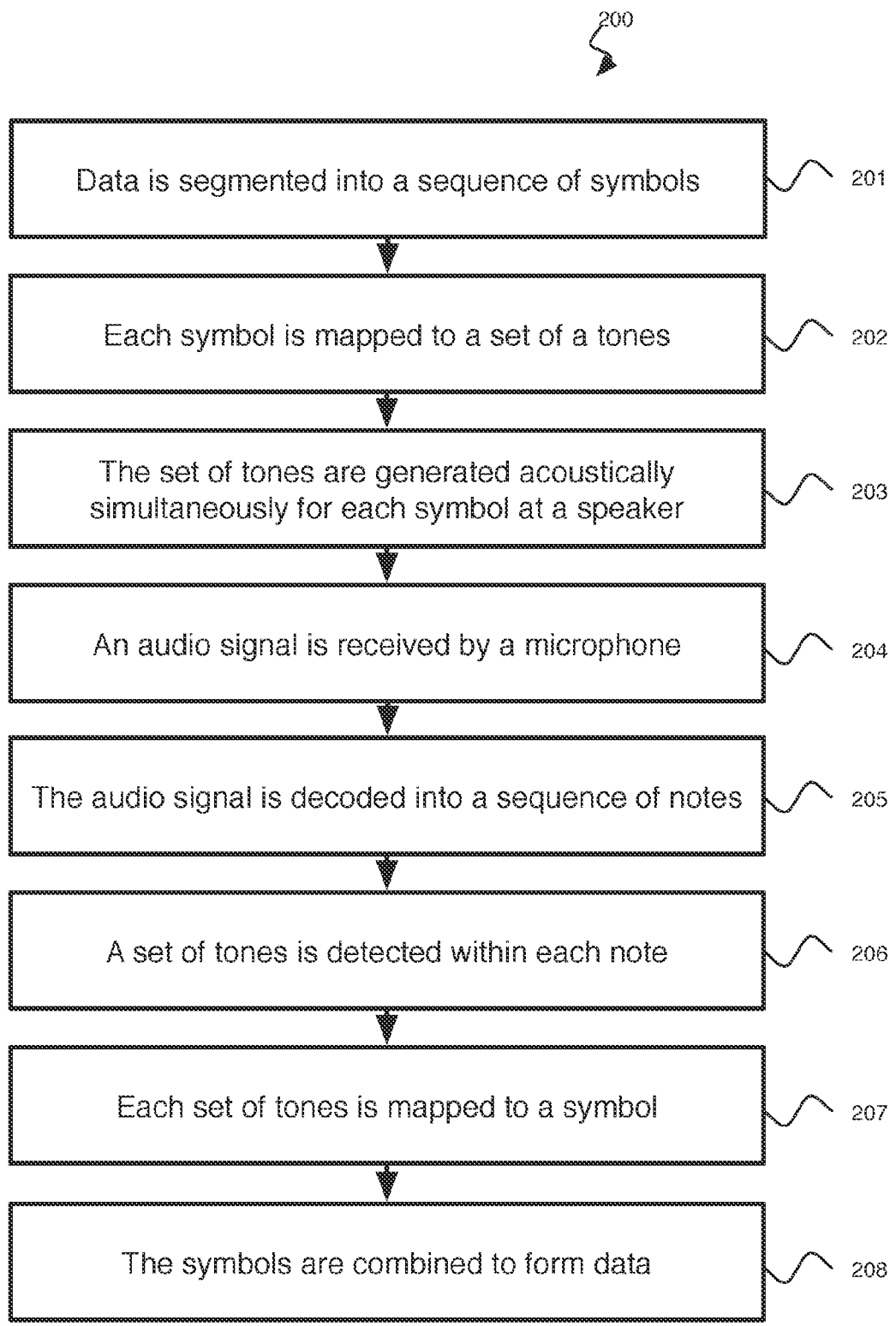
FIG. 2: shows a flow diagram illustrating a data communication method in accordance with an embodiment of the invention.

Referring to FIG. 2, a method 200 for communicating data acoustically will be described.

The data may be comprised of a payload and error correction. In some embodiment, the data may include a header. The header may include a length related to the transmission (e.g. for the entire data or the payload). The length may be the number of symbols transmitted.

In step 201, the data is segmented into a sequence of symbols (e.g. at transmitting apparatus 101 by encoding processor 102). The data may be segmented by first treating the data as a stream of bits. The segment size (B) in bits may be determined by:

$$B = \log_2(M \text{ choose } K)$$

M is the size of the alphabet of the tones at different frequencies spanning an audio spectrum and K is the number of tones per note or chord.

The audio spectrum may be wholly or, at least partially, audible to human beings (e.g. within 20 Hz to 20 kHz), and/or may be wholly, or at least partially, ultrasonic (e.g. above 20 kHz). In one embodiment, the audio spectrum is near-ultrasonic (18 kHz to 20 kHz).

In step 202, each symbol in the sequence may be mapped to a set of tones (e.g. at transmitting apparatus 101 by encoding processor 102) Each set may comprise K tones. The tones may be selected from the alphabet of M tones. Preferably each tone within a set is a different tone selected from the alphabet. The symbol may be mapped to the set of tones via bijective mapping. In one embodiment, a hash-table from symbol to tone set may be used to encode the symbol (a second hash-table may map the set of tones to symbol to decode a detected set of tones). One disadvantage of using hashtables is that because the hash-table must cover all possible selections of tones for the set, as M and/or K increases, the memory requirements may become prohibitively large. Therefore, it may be desirable if a more efficient bijective mapping schema could be used. One embodiment, which addresses this desire, uses a combinatorial number system (combinadics) method to map symbols to tone sets and detected tone sets to symbols.

In the combinadics method, each symbol (as an integer) can be translated into a K-value combinatorial representation (e.g. a set of K tones selected from the alphabet of M tones). Furthermore, each set of K tones can be translated back into a symbol (as an integer).

In step 203, the set of tones may be generated acoustically simultaneously for each symbol in the sequence (e.g. at the transmitting apparatus 101). This may be performed by summing all the tones in the set into an audio signal and transmitting the audio signal via a speaker 103. The audio signal may include a preamble. The preamble may assist in triggering listening or decoding at a receiving apparatus (e.g. 104). The preamble may be comprised of a sequence of single or summed tones.

In step 204, the audio signal may be received by a microphone (e.g. 106 at receiving apparatus 104).

In step 205, the audio signal may be decoded (e.g. via decoding processor 105) into a sequence of notes. Decoding of the audio signal may be triggered by detection first of a preamble.

Each note may comprise a set of tones and the set of tones may be detected within each node (e.g. by decoding processor) in step 206. The tones may be detected by computing a series of FFT frames for the audio signal corresponding to a note length and detecting the K most significant peaks in the series of FFT frames. In other embodiments, other methods may be used to detect prominent tones.

The set of detected tones can then be mapped to a symbol (e.g. via a hash-table or via the combinadics method described above) in step 207.

In step 208, the symbols can be combined to form data. For example, the symbols may be a stream of bits that is segmented into bytes to reflect the original data transmitted.

At one or more of the steps 205 to 208, error correction may be applied to correct errors created during acoustic transmission from the speaker (e.g. 103) to the microphone (e.g. 106). For example, forward error correction (such as Reed-Solomon) may form a part of the data and may be used to correct errors in the data.

Embodiments of the present invention will be further described below:

Symbols, Lexical Mappings and the Combinatorial Number System (Combinadics)

In monophonic M-ary FSK, each symbol can represent M different values, so can store at most $\log_2 M$ bits of data. Within multi-tone FSK, with a chord size of K and an alphabet size of M, the number of combinatoric selections is M choose K:

$$M!/(K!(M-K)!)$$

Thus, for an 6-bit (64-level) alphabet and a chord size K of 4, the total number of combinations is calculated as follows:

$$64!/(4!60!) = 635,376$$

Each symbol should be expressible in binary. The $\log_2$ of this value is taken to deduce the number of combinations that can be expressed, which is in this case $2^{19}$. The spectral efficiency is thus improved from 6-bit per symbol to 19-bit per symbol.

Combinadics

To translate between K-note chords and symbols within the potential range, a bijective mapping must be created between the two, allowing a lexographic index A to be derived from a combination $\{X_1, X_2, \ldots X_K\}$ and vice-versa.

A naive approach to mapping would work by:
generating all possible combinations, and
storing a pair of hashtables from $A \leftrightarrow \{X_1, X_2, \ldots X_K\}$
Example for M=4, K=3

$$0 - \{0, 1, 2\}$$
$$1 - \{0, 1, 3\}$$
$$2 - \{0, 1, 4\}$$
$$3 - \{0, 2, 3\}$$
$$4 - \{0, 2, 4\}$$
$$5 - \{0, 3, 4\}$$
$$6 - \{1, 2, 3\}$$
$$7 - \{1, 2, 4\}$$
$$8 - \{1, 3, 4\}$$
$$9 - \{2, 3, 4\}$$

As the combinatoric possibilities increase, such as in the above example, the memory requirements become prohibitively large. Thus, an approach is needed that is efficient in memory and CPU.

Mapping from Data to Combinadics to Multi-Lone FSK

To therefore take a stream of bytes and map it to a multi-tone FSK signal, the process is as follows:
segment the stream of bytes into B-bit symbols, where $2^B$ is the maximum number of binary values expressible within the current combinatoric space (e.g. M choose K)
translate each symbol into its K-value combinatorial representation
synthesize the chord by summing the K tones contained within the combination In one embodiment, a transmission "frame" or packet may be ordered as follows:
1. Preamble/wakeup symbols (F)
2. Payload symbols (P)
3. Forward error-correction symbols (E)
FF PPPPPPPP EEEEEEEE At decoding, a receiving may:
decode each of the constituent tones using an FFT
segment the input into notes, each containing a number of FFT frames equal to the entire expected duration of the note
use a statistical process to derive what seem to be the K most prominent tones within each note
translate the K tones into a numerical symbol using the combinatorial number system process described above
concatenate the symbols to the entire length of the payload (and FEC segment)
re-segment into bytes
and finally, apply the FEC algorithm to correct any mis-heard tones In another embodiment, the FEC algorithm may be applied before re-segmentation into bytes.

A potential advantage of some embodiments of the present invention is that data throughput for acoustic data communication systems can be significantly increased (bringing throughput closer to the Shannon limit for the channel) in typical acoustic environments by improved spectral efficiency. Greater efficiency results in faster transmission of smaller payloads, and enables transmission of larger payloads which previously may have been prohibitively slow for many applications.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A device, comprising:
one or more processors; and
a non-transitory computer-readable medium storing instructions that, when executed by the one or more processors, cause the device to:
segment data into a sequence of symbols, each of the symbols having a preset number of bits;
determine for each symbol of the sequence of symbols three or more tones based on a mapping between symbols and sets of tones selected from tones spread evenly over a frequency spectrum, wherein the mapping includes a mapping between the symbols and a multi-tone Frequency Shift Keying (FSK) signal including three or more tones; and
generate an audio signal based on the determined tones for each symbol of the sequence of symbols.

2. The device of claim 1, wherein each of the three or more tones for each symbol in the sequence of symbols is at a different frequency.

3. The device of claim 1, wherein the mapping comprises a bijective mapping.

4. The device of claim 1, further comprising:
a speaker,
wherein the non-transitory computer-readable medium storing instructions that, when executed by the one or more processors, further cause the device to:
transmit, via the speaker, the generated audio signal.

5. The device of claim 4, wherein transmit, via the speaker, the generated audio signal comprises:
for each symbol in the sequence of symbols, cause, via the speaker, simultaneous playback of the three or more tones determined for the respective symbol.

6. The device of claim 1, wherein generate an audio signal based on the three or more tones comprises:
generate a packet for a first set of symbols of the sequence of symbols, wherein the packet comprises a payload comprising the determined three or more tones.

7. The device of claim 6, wherein the non-transitory computer-readable medium storing instructions that, when executed by the one or more processors, further cause the device to:
transmit, to a speaker, the packet for the first set of symbols of the sequence of symbols.

8. A non-transitory, computer-readable medium storing instructions that, when executed by one or more processors, cause a device to:
- segment data into a sequence of symbols, each of the symbols having a preset number of bits;
- determine for each symbol of the sequence of symbols three or more tones based on a mapping between symbols and sets of tones selected from tones spread evenly over a frequency spectrum, wherein the mapping includes a mapping between the symbols and a multi-tone Frequency Shift Keying (FSK) signal including three or more tones; and
- generate an audio signal based on the determined tones for each symbol of the sequence of symbols.

9. The non-transitory, computer-readable medium of claim 8, wherein each of the three or more tones for each symbol in the sequence of symbols is at a different frequency.

10. The non-transitory, computer-readable medium of claim 8, wherein the mapping comprises a bijective mapping.

11. The non-transitory, computer-readable medium of claim 8, further comprising instructions, that when executed by the one or more processors, cause the device to:
- transmit, via a speaker, the generated audio signal.

12. The non-transitory, computer-readable medium of claim 11, wherein transmit, via the speaker, the generated audio signal comprises:
- for each symbol in the sequence of symbols, cause, via the speaker, simultaneous playback of the three or more tones determined for the respective symbol.

13. The non-transitory, computer-readable medium of claim 8, wherein generate an audio signal based on the three or more tones comprises:
- generate a packet for a first set of symbols of the sequence of symbols, wherein the packet comprises a payload comprising the determined three or more tones.

14. The non-transitory, computer-readable medium of claim 13, further comprising instructions that, when executed by the one or more processors, further cause the device to:
- transmit, to a speaker, the packet for the first set of symbols of the sequence of symbols.

15. A method, comprising:
- segmenting data into a sequence of symbols, each of the symbols having a preset number of bits;
- determining for each symbol of the sequence of symbols three or more tones based on a mapping between symbols and sets of tones selected from tones spread evenly over a frequency spectrum, wherein the mapping includes a mapping between the symbols and a multi-tone Frequency Shift Keying (FSK) signal including three or more tones; and
- generating an audio signal based on the determined tones for each symbol of the sequence of symbols.

16. The method of claim 15, wherein each of the three or more tones for each symbol in the sequence of symbols is at a different frequency.

17. The method of claim 15, wherein the mapping comprises a bijective mapping.

18. The method of claim 15, further comprising:
- causing, via a speaker, simultaneous playback of the three or more tones determined for the respective symbol for each symbol in the sequence of symbols.

19. The method of claim 15, wherein generating an audio signal based on the three or more tones comprises:
- generating a packet for a first set of symbols of the sequence of symbols, wherein the packet comprises a payload comprising the determined three or more tones.

20. The method of claim 19, further comprising:
- transmitting, to a speaker, the packet for the first set of symbols of the sequence of symbols.

* * * * *